(12) United States Patent
Dosch et al.

(10) Patent No.: US 6,799,459 B2
(45) Date of Patent: Oct. 5, 2004

(54) GRAVITY GRADIOMETER AND METHOD FOR CALCULATING A GRAVITY TENSOR WITH INCREASED ACCURACY

(75) Inventors: Daniel E. Dosch, Hamburg, NY (US); David L. Sieracki, Depew, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/384,370

(22) Filed: Mar. 6, 2003

(65) Prior Publication Data

US 2003/0209070 A1 Nov. 13, 2003

Related U.S. Application Data

(60) Provisional application No. 60/361,699, filed on Mar. 6, 2002.

(51) Int. Cl.[7] .................................................. G01V 7/00
(52) U.S. Cl. .................................................. 73/382 G
(58) Field of Search .......................... 73/382 G, 382 R; 702/2

(56) References Cited

U.S. PATENT DOCUMENTS

| | | |
|---|---|---|
| 3,727,462 A | 4/1973 | Stone et al. |
| 4,992,656 A | 2/1991 | Clauser |
| 5,357,802 A | 10/1994 | Hofmeyer et al. |
| 5,402,340 A | 3/1995 | White et al. |
| 5,922,951 A | 7/1999 | O'Keefe et al. |
| 5,962,781 A | 10/1999 | Veryaskin |
| 6,082,194 A | 7/2000 | Gladwin |
| 6,125,698 A | * 10/2000 | Schweitzer et al. ....... 73/382 G |

FOREIGN PATENT DOCUMENTS

WO     WO 95/05614     2/1995

OTHER PUBLICATIONS

International Search Report for PCT/US 03/06867 dated Aug. 21, 2003.

* cited by examiner

*Primary Examiner*—John E. Chapman
(74) *Attorney, Agent, or Firm*—Graybeal Jackson Haley LLP

(57) ABSTRACT

A method includes measuring an acceleration along an input axis of an accelerometer mounted to a gradiometer disc, the accelerometer having a coordinate axis that is parallel to a spin axis of the disc, and includes calculating a gravity tensor element as a function of the measured acceleration and a component of the measured acceleration caused by an acceleration along the coordinate axis. Consequently, this technique typically yields a more accurate calculation of the gravitational field by accounting for undesired accelerations picked up by accelerometers having input axes that are not parallel to the gradiometer disc.

20 Claims, 5 Drawing Sheets

GRAVITY GRADIOMETER AND METHOD FOR CALCULATING A GRAVITY TENSOR WITH INCREASED ACCURACY

CROSS-REFERENCE TO RELATED APPLICATIONS

This application claims priority to U.S. Provisional Application Ser. No. 60/361,699, filed on Mar. 6, 2002, which is incorporated by reference.

BACKGROUND

Geologists have discovered that one can identify certain physical characteristics of a geological formation from the gravitational potential field (denoted with the symbol G in this application) near the formation. For example, the gravitational field G can often indicate the presence and yield the identity of a mineral such as coal that is located beneath the surface of the formation. Therefore, measuring and analyzing the gravitational field G of a formation, can often yield such physical characteristics of the formation more easily and less expensively than an invasive technique such as drilling. Relevant characteristics of the field are typically determined not by measuring the gravitational potential G directly, but either by measuring components of the gravitational acceleration vector g resulting from this field or by measuring spatial derivatives of these acceleration vector components. The three components of the acceleration vector can each be spatially differentiated along three different axes providing a set of nine different signals mathematically related to the underlying gravitational potential G. These nine signals are the gravitation tensor elements (sometimes called the gravity Gradients), and much effort has gone into developing techniques for accurately measuring these tensor elements.

Referring to FIG. 1, one can use a gravity gradiometer 10 to measure the gravitational potential field G near a geological formation (not shown). The notation used in this patent to the refer to the nine gravitational field tensor elements in matrix form is:

$$\Gamma = \begin{bmatrix} \Gamma_{xx} & \Gamma_{xy} & \Gamma_{xz} \\ \Gamma_{yx} & \Gamma_{yy} & \Gamma_{yz} \\ \Gamma_{zx} & \Gamma_{zy} & \Gamma_{zz} \end{bmatrix} \quad (1)$$

where the matrix members represent the respective gravity tensors along each of the three X, Y, and Z "body" axes, which typically intersect at the centroid 12 of the gradiometer 10. For example, the tensor element $\Gamma_{xx}$ (which can be expressed in equivalent units of (meters/seconds$^2$)/meter, 1/seconds$^2$, or Eötvös units where 10$_9$ Eötvös=1/seconds$^2$) is the spatial partial derivative along the X axis of the X component of the gravitational acceleration vector g, $\Gamma_{xy}$ is the spatial partial derivative along the Y axis of the X component of g, $\Gamma_{xz}$ is the spatial partial derivative along the Z axis of the X component of g, $\Gamma_{yx}$ is the spatial partial derivative along the X axis of the Y component of g, etc. Furthermore, although the tensors elements $\Gamma$ may vary over time, for many formations the tensor elements $\Gamma$ are constant over time, or vary so slowly that they can be treated as being constant over time. Moreover, in some applications the gradiometer 10 may make measurements sufficient to calculate only the desired elements of the full tensor $\Gamma$. To measure the gravitational potential field G of a geological formation (not shown in FIG. 1), one mounts the gradiometer 10 in a vehicle (not shown) such as a helicopter that sweeps the gradiometer over the formation. For maximum accuracy, it is desired that the gradiometer 10 not rotate at a high rate about any of the X, Y, and Z body axes as it sweeps over the formation. But unfortunately, the vehicle often generates vibrations (e.g., engine) or is subject to vibrations (e.g., wind) that causes such rotations about the body axes. Therefore, the gradiometer 10 is often rotationally isolated from the vehicle by a gimballing system (not shown) which allows the gradiometer to remain non-rotating even as the vehicle experiences varying orientations typical of its operation. The gimballing system carrying the gradiometer 10 typically includes a rotational sensor assembly 18, such as a gyroscope assembly for measuring rotational activity (typically rotational rate ω or rotational displacement) about the X, Y, and Z body axes. Control signals derived form these measurements are fed back to the motors attached to the gimbal axes to reduce the rotations experienced by the gradiometer 10. But although the gimballing system typically reduces the magnitude of the vibration-induced rotations of the gradiometer 10 about the body axes, it is typically impossible to eliminate such rotations altogether. Even with an ideal gradiometer, the tensor measurement would, of physical necessity, be additively corrupted by the presence of gradient signals caused by these rotations. These additional non-gravitational gradients are simple deterministic functions of the rotational rates (e.g. rotational $\Gamma = \omega_x$, $\omega_y$ where $\omega_j$ refers to the rotational rate around the j body axis in radians/sec). Consequently, the measurements from the gradiometer 10 typically have these corrupting signals subtracted by a processor 20 to increase the accuracy of the gradiometer's measurement of the gravitational field G as discussed below in conjunction with FIG. 3. Although shown as being disposed within the housing 16, the processor 20 may be disposed outside of the housing for processing of the measurement data from the gradiometer 10 in real time or after the gradiometer measures the gravitational field G. In the latter case, the gradiometer 10 typically includes a memory 22 for storage of the measurement data for later download to the external processor 20. Alternatively, the gradiometer 10 may include a transmitter (not shown) for transmitting the measurement data to the external processor 20 and/or an external memory 22. Moreover, the processor 20 or memory 22 includes a sample-and-hold circuit (not shown) and an analog-to-digital converter (ADC) (not shown) to digitize the gradiometer measurement data and any other measured signals required for optimal operation.

Referring to FIG. 2, the gravity gradiometer 10 of FIG. 1 includes one or more disc assemblies—here three disc assemblies 24, 26, and 28—each for measuring a subset of the full set of tensors F for the gravitational field G of a geological formation 36.

Each disc assembly 24, 26, and 28 includes a respective disc 30, 32, and 34 that is mounted in a respective plane that is coincident or parallel with one of the three body-axis planes such that the spin axis of the disc is either coincident with or parallel to the body axis that is normal to the mounting plane. Furthermore, each disc includes orthogonal disc axes that lie in but rotate relative to the mounting plane. For example, the disc 30 lies in the X-Y body-axis plane, has a spin axis Zs that is parallel to the Z body axis—that is, the X-Y coordinates of $Z_S$ are (X=C1, Y=C2) where C1 and C2 are constants—and includes orthogonal disc axes $X_D$ and $Y_D$. As the disc 30 rotates—here in a counterclockwise direction—the $X_D$ and $Y_D$ disc axes rotate relative to the non-rotating X and Y body axes. At the instant of time represented in FIG. 2, the $X_D$ and $Y_D$ disc axes of the disc 30 are respectively parallel and coincident with the X and Y body axes. In addition, the disc 32 lies in a plane that is parallel to the Y-Z body-axis plane and has a spin axis $X_S$ that is parallel to the X body axis. At the instant of time represented in FIG. 2, the $Y_D$ and $Z_D$ disc axes of the disc 32 are respectively parallel with the Y and Z body axes.

To measure the gravitational field G, the disc assemblies 24, 26, and 28 each include at least one respective pair of accelerometers that are mounted $\pi$ radians apart on the discs 30, 32, and 34, respectively. For clarity of explanation, only the disc assembly 24 is discussed, it being understood that the other disc assemblies 26 and 28 are similar. Here, the disc assembly 28 includes two pairs of accelerometers 38a, 38b and 38c, 38d. Each accelerometer 38a, 38b, 38c, and 38d includes a respective input axis 40a, 40b, 40c, and 40d along which the accelerometer measures a respective acceleration magnitude Aa, Ab, Ac, and Ad, and each accelerometer is mounted to the disc 30 such that its input axis is a radius R from the spin axis $Z_S$ and is perpendicular to R. The accelerometers 38a and 38b of the first pair are mounted $\pi$ radians apart on the $X_D$ disc axis, and the accelerometers 38c and 38d are mounted $\pi$ radians apart on the $Y_D$ disc axis. Although ideally described as being perpendicular to the radius R, the input axes 40a, 40b, 40c, and 40d may actually be oriented at other angles relative to R intentionally or due to manufacturing imperfections. Furthermore, the disc assembly 24 may include additional pairs of accelerometers that are mounted on the disc 30 between the accelerometers 38a, 38b, 38c, and 38d. For example, the disc assembly 24 may include additional accelerometers 38e, 38f, 38g, and 38h, which are respectively spaced $\pi/4$ radians from the accelerometers 38a, 38b, 38c, and 38d. As is known, these additional accelerometers allow, through redundant measurement, an increase in the signal-to-noise ratio (SNR) of the gravitational-field measurement.

Referring to FIG. 3, the operation of the disc assembly 24 is discussed, it being understood that the operation of the disc assemblies 26 and 28 of FIG. 2 is similar.

FIG. 3 is a top view of the disc assembly 24 where the spin axis Zs extends out of the page from the center 50 of the disc 30. For purposes of explanation, the following ideal conditions are assumed. First, the disc 30 spins in a counterclockwise direction at a constant rate of $\Omega$, which has units of radians/second. Second, the input axes 40 are each aligned perfectly with either the $X_D$ or $Y_D$ disc axes and as a result lie in or parallel to the X-Y plane. Third, the accelerometers are all the same radial distance R from the $Z_S$ spin axis. And fourth, there are no rotations of the disc 30 about the X or Y body axes.

At a time t=0, the $X_D$ and $Y_D$ disc axes of the disc 30 are respectively parallel and coincident with the body axes X and Y. As the disc 30 spins, the $X_D$ disc axis forms an angle $\Omega t$ relative to its initial (t=0) position. To illustrate this rotation, the position of the $X_D$ and $Y_D$ axes and the accelerometer 38a are shown in dashed line at $\Omega t = \pi/4$ radians. Although not shown in dashed line, the other accelerometers 38b, 38c, and 38d are also $\pi/4$ radians from their illustrated ($\Omega t=0$) positions when $\Omega t=\pi/4$ radians. Consequently, an equation that represents the acceleration Aa in terms of the gravity tensor elements $\Gamma_{xx}$, $\Gamma_{xy}$, $\Gamma_{yx}$, and $\Gamma_{yy}$, can be derived as follows, where $a_x$ and $a_y$ are the gravitational-field induced accelerations at the center 50 in the X and Y directions, respectively. Specifically, Aa equals the component of acceleration along the input axis 40a caused by an acceleration in the Y direction minus the component of acceleration along the input axis caused by an acceleration in the X direction. Therefore, $$Aa = (a_y + \Gamma_{yx}R\cos\Omega t + \Gamma_{yy}R\sin\Omega t)\cos\Omega t - (a_x + \Gamma_{xx}R\cos\Omega t + \Gamma_{xy}R\sin\Omega t)\sin\Omega t \quad (2)$$

Expanding the terms of equation (2) gives:

$$Aa = a_y\cos\Omega t + \Gamma_{yx}R\cos^2\Omega t + \Gamma_{yy}R\sin\Omega t\cos\Omega t - a_x\sin\Omega t - \Gamma_{xx}R\cos\Omega t\sin\Omega t - \Gamma_{xy}R\sin^2\Omega t \quad (3)$$

Using trigonometric identities for $\cos^2\Omega t$ and $\cos\Omega t\sin\Omega t$, and realizing that $\Gamma_{xy}=\Gamma_{yx}$ for any gravitational field G, one obtains:

$$Aa = a_y\cos\Omega t - a_x\sin\Omega t + \Gamma_{xy}R\left(\frac{1}{2}+\frac{1}{2}\cos2\Omega t\right) + \qquad (4)$$

$$\Gamma_{yy}\frac{R}{2}\sin2\Omega t - \Gamma_{xx}\frac{R}{2}\sin2\Omega t - \Gamma_{xy}R\left(\frac{1}{2}-\frac{1}{2}\cos2\Omega t\right)$$

And combining terms of equation (4) gives:

$$Aa = a_y\cos\Omega t - a_x\sin\Omega t + \Gamma_{xy}R\cos2\Omega t + \frac{R}{2}\sin2\Omega t(\Gamma_{yy}-\Gamma_{xx}) \qquad (5)$$

Because the accelerometer 38b is always $\pi$ radians from the accelerometer 38a, one can easily derive the following equation for the acceleration magnitude Ab by replacing "$\Omega t$" with "$\Omega t+\pi$" in equations (2)–(5):

$$Ab = -a_y\cos\Omega t + a_x\sin\Omega t + R\cos2\Omega t\Gamma_{xy} + \frac{R}{2}\sin2\Omega t(\Gamma_{yy}-\Gamma_{xx}) \qquad (6)$$

Summing equations (5) and (6) gives the following equation for the expected idealized output of the sum of these two accelerometers:

$$Aa+Ab=2\Gamma_{xy}R\cos2\Omega t+R\sin2\Omega t(\Gamma_{yy}-\Gamma_{xx}) \qquad (7)$$

To increase the accuracy of the measurement (in view of potential errors as discussed below), one can derive equations that represent Ac and Ad in terms of the gravity tensor elements $\Gamma_{xx}$, $\Gamma_{xy}=\Gamma_{yx}$, and $\Gamma_{yy}$ by respectively replacing "$\Omega t$" with "$\Omega t+\pi/2$" and "$\Omega t+3\pi/2$" in equations (2)–(6) to arrive at the following equation:

$$Ac+Ad=-2\Gamma_{xy}R\cos2\Omega t-R\sin2\Omega t(\Gamma_{yy}-\Gamma_{xx}) \qquad (8)$$

Subtracting these two accelerometer sums (reflected in equations 7 and 8) provides the following equation, which is the basic element of measurement for gradiometers of this design:

$$\frac{(Aa+Ab)-(Ac+Ad)}{2} = 2\Gamma_{xy}R\cos2\Omega t + R\sin2\Omega t(\Gamma_{yy}-\Gamma_{xx}) \qquad (9)$$

This combination signal, which is normally called the bandpass signal, is typically bandpass filtered and digitized, and is then synchronously demodulated by the processor 20 at sin $2\Omega t$ and cos $2\Omega t$ to recover $\Gamma_{xy}=\Gamma_{yx}$ and $(\Gamma_{yy}-\Gamma_{xx})/2$.

Still referring to FIG. 3, the conditions that were assumed to be ideal for the derivation of equations (2)–(9) are, unfortunately, seldom ideal. Consequently, these non-ideal conditions introduce additional acceleration terms into these equations, and these terms can reduce the accuracy of the calculated gravity tensor elements if unaccounted for. But fortunately, the processor 20 can account for many of these additional terms as discussed below.

For example, still referring to FIG. 3, the motor (not shown) that spins the disc 30 may be unable to maintain a constant rotation rate Ω. Such uneven rotation may cause the pairs of accelerometers to sense reinforcing accelerations that swamp out the accelerations caused by the gravitational field. Consequently, the gradiometer 10 (FIG. 1) may include a sensor (not shown) that measures the rotation rate Ω as a function of time, and the processor 20 can use this measurement to conventionally include the acceleration term introduced by the uneven rotation in the equations (2)–(9).

Furthermore, as discussed above in conjunction with FIG. 1, vibrations of the vehicle (not shown) or other forces may cause the gradiometer 10 to rotate about the X or Y body axes. Such rotations may cause the pairs of accelerometers to sense reinforcing accelerations that swamp out the accelerations caused by the gravitational field. For example, assume that the gradiometer 10 rotates about the Y body axis with a rotational rate (in units of radians/second) $\omega_y$. This rotation causes the accelerometer 38a to sense a centripetal acceleration toward the Y axis along a moment arm 52 according to the following equation, where AaY is the acceleration term added to equation (2) due to this centripetal acceleration:

$$Aay = (\omega_y)^2 R \cos \Omega t \sin \Omega t \quad (10)$$

The accelerometer 38b senses an identical centripetal acceleration AbY, and the corresponding centripetal accelerations AcY and AdY sensed by the accelerometers 38c and 38d are given by an equation similar to equation (10). Consequently, the processor 20 can use the signals (from the gyroscope assembly 18 of FIG. 1) that represent the rotational rates $\omega_x$, $\omega_y$, and $\omega_z$ to include AaY, AbY, AcY, and AdY in equation (9), and thus to compensate the gradient measurements for centripetally induced errors introduced by rotations about the X, Y, and Z body axes.

Similarly, the processor 20 can often account for errors introduced by the input axes 40 of the accelerometer pairs not making the same angle with the respective $X_D$ or $Y_D$ disc axis or not being the same radial distance R from the disc center 50. In these cases, the precise amount of misalignment or radial distance error is typically unknown (though it may be relatively constant for a given gradiometer instrument and may be imperfectly known), and thus the error introduced into the gravitational-field measurement may not be exactly known. However if the functional relationship between the causative error and the resulting signal corruption is known, then this information can be included in an estimation procedure that allows test measurements to be processed, an optimal fit to be made between the measurements identified as being corrupt, and finally a compensation to be applied using these optimal fit estimates. Most often there is a linear (or linearizable) relationship between the error parameters and resultant signal corruptions and a standard least-squares fit is made between the corrupted measurements and arbitrarily scaled calculations of the expected signal corruptions. These expected functions are called regressors, and the fit procedure calculates the extent to which these regressors appear in the raw measurements.

Unfortunately, no set of regressors fits all the acceleration and rotationally induced error found in a gradiometer system. An important part of improving gradiometer instrument performance is the identification of error sources, estimation and compensation of the error effect found in particular instruments, and perhaps adjustment of the instrument build/setup to reduce the physical effects leading to the errors.

SUMMARY

Embodiments of the invention as discussed below concern the discovery of one such error mechanism, the calculation of the error effect resulting from this (thus allowing for compensation and improved measurement performance), and identification of instrument adjustments for reducing the magnitude of the raw effect of the error In one aspect of the invention, a method includes measuring an acceleration along an input axis of an accelerometer mounted to a gradiometer disc, the accelerometer having a coordinate axis that is parallel to a spin axis of the disc, and includes calculating a gravity tensor element as a function of the measured acceleration and a component of the measured acceleration caused by an acceleration along the coordinate axis.

This technique typically yields a more accurate calculation of the gravitational field by accounting for undesired accelerations picked up by accelerometers having input axes that are not parallel to the gradiometer disc. Furthermore, this technique is applicable to systems that measure the full gravitational tensor as well as to those that measure a subset of the full tensor.

DESCRIPTION OF THE INVENTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention as defined by the appended claims. Thus, the present invention is not intended to be limited to the embodiments shown, but is to be accorded the widest scope consistent with the principles and features disclosed herein.

Figure 3:
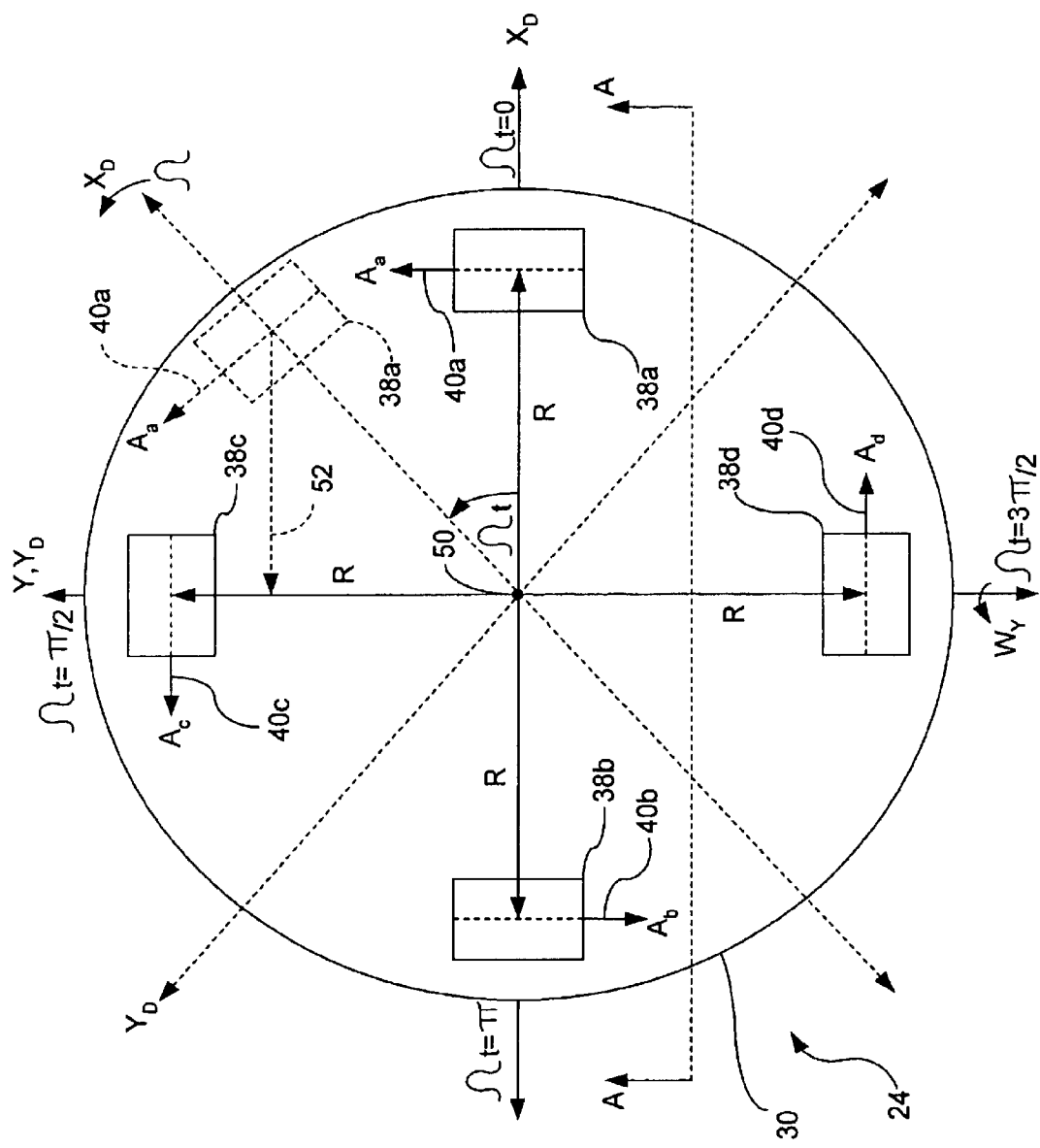
FIG. 3 is a plan view of one of the gradiometer disc assemblies of FIG. 2.
Figure 4B:
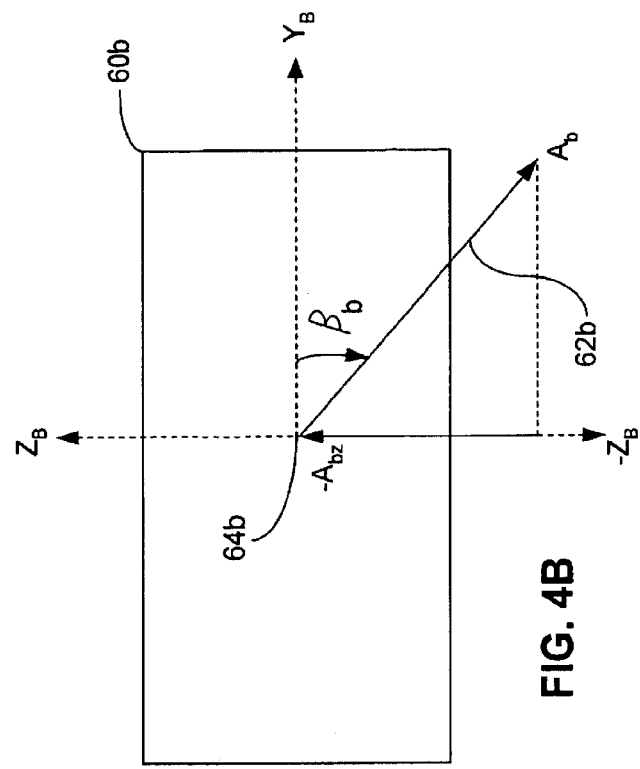
FIGS. 4A and 4B are side views of respective first and second accelerometers of an accelerometer pair according to an embodiment of the invention.
Figure 4A:
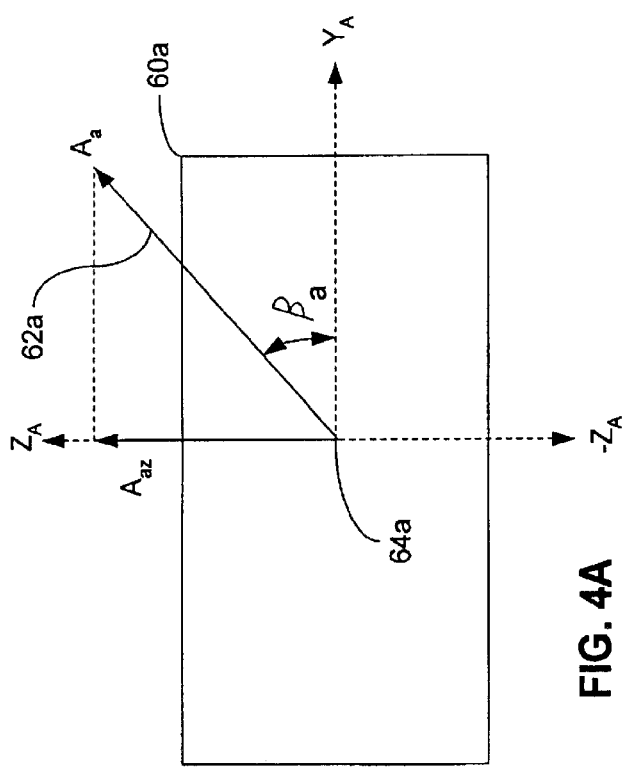

FIGS. 4A and 4B are side views of respective first and second accelerometers 60a and 60b of an accelerometer pair according to an embodiment of the invention. Referring to FIG. 3, the accelerometers 60a and 60b are mounted to a disc such as the disc 30 and are spaced π radians apart like the accelerometers 38a and 38b. But unlike the ideally oriented accelerometers 38a and 38b, the accelerometers 60a and 60b have respective input axes 62a and 62b that, perhaps through manufacturing irregularities, are not parallel to the disc, and thus may introduce additional acceleration terms into equations (2)–(9). Each accelerometer 60a and 60b has a coordinate system with an origin 64a and 64b, respectively. Referring to the accelerometer 60a, the $Z_A$ axis is parallel to the $Z_S$ spin axis of the disc, the $Y_A$ axis is parallel to the disc and is orthogonal to the radius of the disc at the origin 64a, and the $X_A$ axis is coincident with the radius of the disc that intersects the origin 64a, and thus is normal to the drawing page at the origin 64a. Likewise, referring to the accelerometer 60b, the $Z_B$ axis is parallel to the $Z_S$ spin axis of the disc, the $Y_B$ axis is parallel to the disc and is orthogonal to the radius of the disc at the origin 64b, and the $X_B$ axis is coincident with the radius of the disc that intersects the origin 64b, and thus is normal to the drawing page at the origin 64b.

Referring to FIG. 4A, the accelerometer 60a measures a component of accelerations that occur along the $Z_A$ axis, and thus will add to the acceleration terms in equations (2)–(9). Unless these accelerations are removed from the acceleration measurements, they will introduce errors into the calculation of the gravity tensor elements. Specifically, the input axis 62a of the accelerometer 60a makes a nonzero angle $\beta_a$ with the $Y_A$ axis—unlike the input axis 40a of the accelerometer 38a (FIG. 3), which makes a zero angle ($\beta_a$=0) with its $Y_A$ axis (not shown in FIG. 3). Therefore, because the input axis 62a has a projection along the $Z_A$ axis, the accelerometer 62a will measure an acceleration term Aaz of Aa in response to an acceleration $AZ_A$ along the $Z_A$ axis according to the following equation:

$$Aaz = AZ_A \sin \beta_a \quad (11)$$

Therefore, to accurately reflect the effect of axial misalignment, $\beta_a$, in the calculation of the gravitational field, the term Aaz should be included in the right-hand sides of equations (2)–(5). Similarly, referring to FIG. 4B, the accelerometer 60b will measure an acceleration term Abz of Ab in response to an acceleration $AZ_B$ (that is, an acceleration along the $Z_B$ axis at location 64b) according to the following equation:

$$Abz = AZ_B \sin (\beta_b) \quad (12)$$

And to accurately reflect the effect of $\beta_b$, the term Abz should be included in the right-hand side of equation (6).

Figure 1:
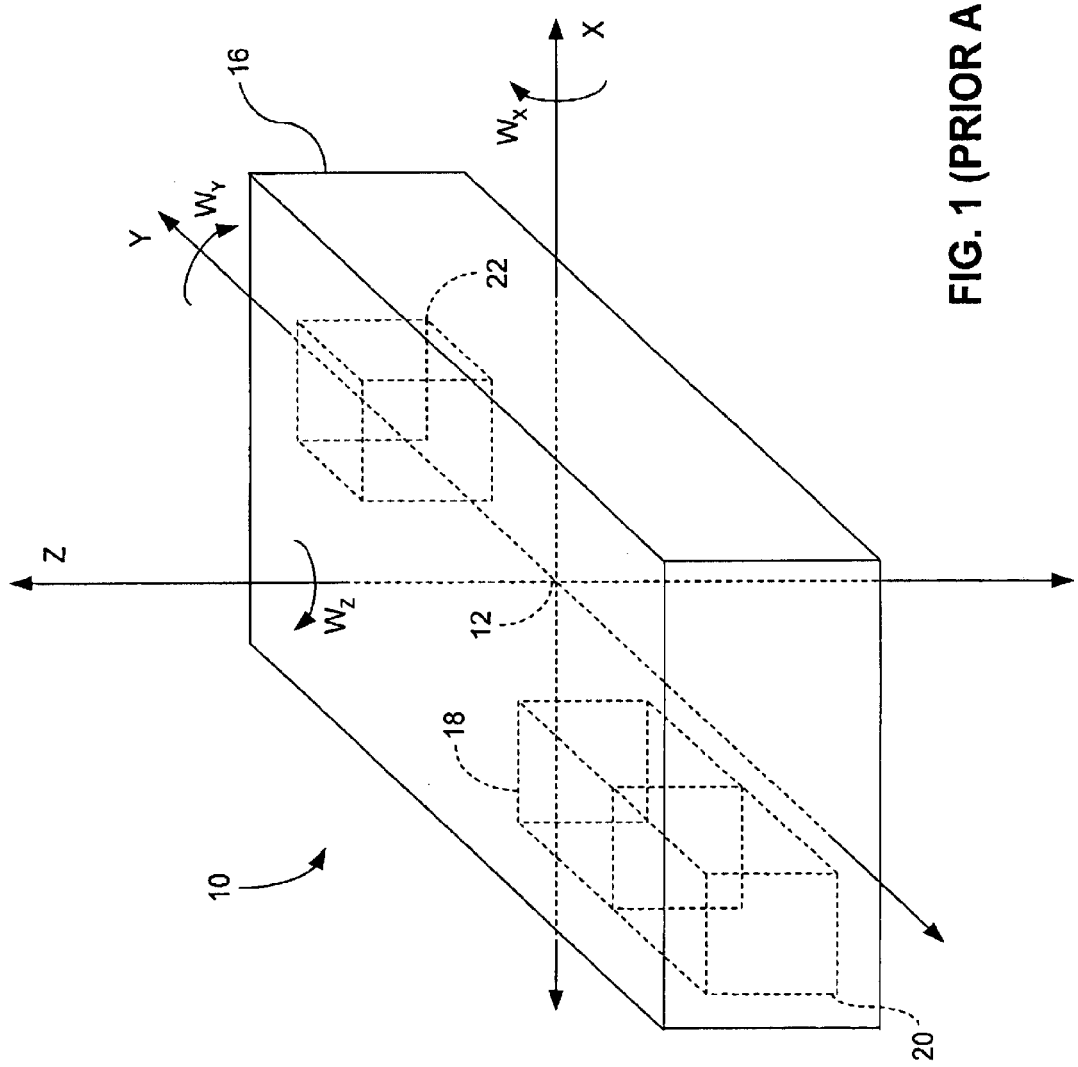
FIG. 1 is a view of a conventional gravity gradiometer.
Figure 2:
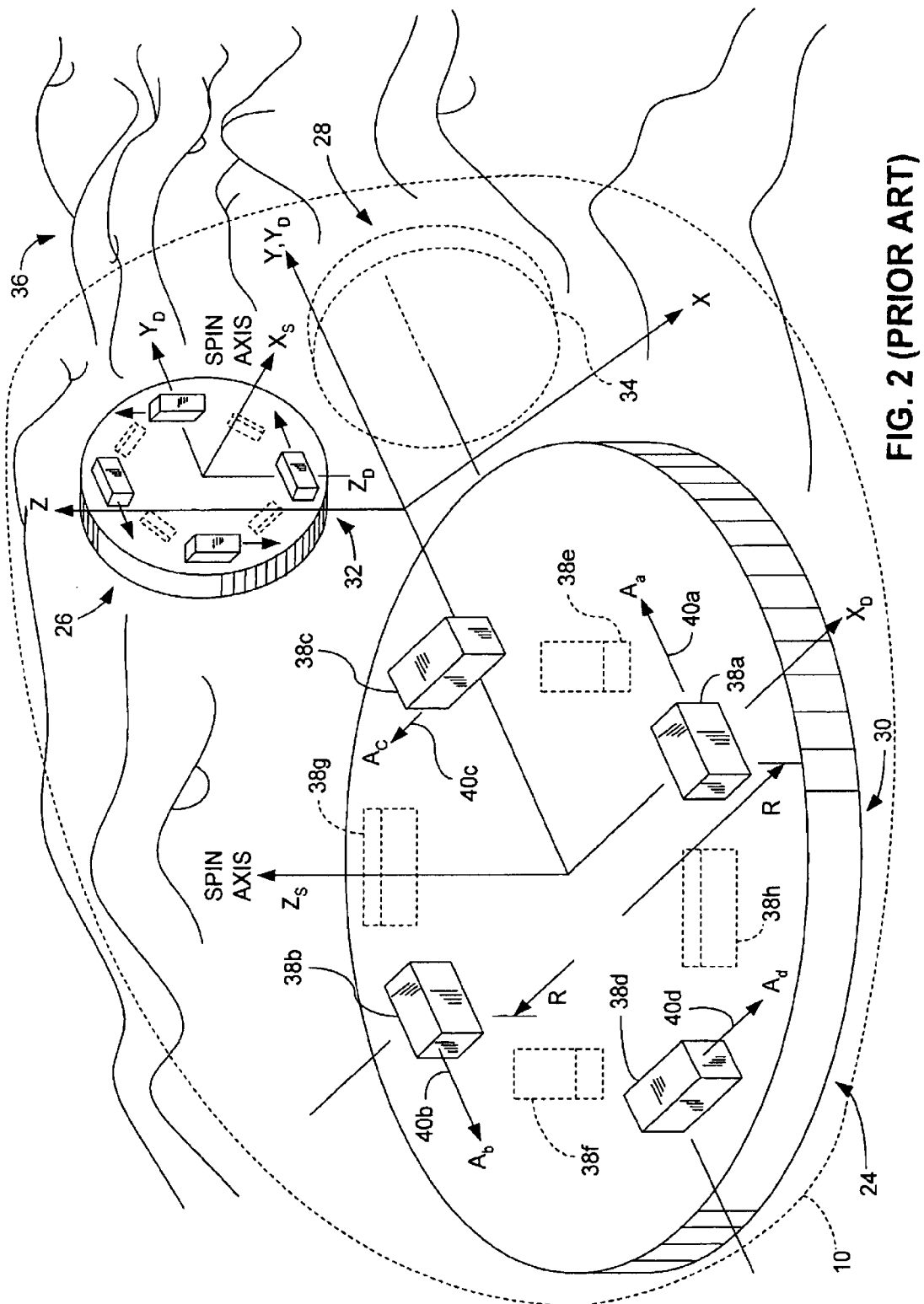
FIG. 2 is a view of the conventional gradiometer disc assemblies inside the gravity gradiometer of FIG. 1.

Referring to FIGS. 1, 4A, and 4B and assuming that the accelerometers 60a and 60b are mounted to the disc 30 in place of the accelerometers 38a and 38b, one cause of accelerations $AZ_A$ and $AZ_B$ along the $Z_A$ and $Z_B$ axes is a nonrotational acceleration along the Z body axis, and thus along the spin axis $Z_S$. For example, the vehicle carrying the gradiometer 10 may be accelerated along the Z axis by a gust of wind. In this case $AZ_A = AZ_B = AZ_S$ An established technique for canceling the terms Aaz and Abz introduced into the equations (2)–(9) by such a nonrotational acceleration is to mount the accelerometers 60a and 60b on the disc 30 such that $\beta_b = -\beta_a$. Because the accelerations Aa and Ab are summed together per equation (7), then $Aaz+Abz=AZ_S \sin \beta_a + AZ_S \sin \beta_b = AZ_S \sin \beta_a - AZ_S \sin \beta_a = 0$. And even if one cannot mount the accelerometers 60a and 60b such that $\beta_b$ exactly equals $-\beta_a$, often one can get $\beta_b$ close enough to $-\beta_a$ such that Aaz+Abz is negligible and Aaz and Aab can be eliminated from equations (2)–(9). But in general Aaz+Abz is not negligible and the misalignments $\beta_a$ and $\beta_b$ are too small to identify using conventional accelerometer calibration techniques. Therefore, one method developed for gradiometer use is to inject a common (i.e. non-rotational) acceleration along the $Z_S$ axis and through examination of the accelerometer summation signal identify the common part of the misalignments. This acceleration can be injected by a calibration machine during pre-shipment calibration of the gradiometer. Alternatively, the gradiometer can self calibrate by using accelerations provided by the vehicle in which it is mounted. In this way the axial misalignment of one arbitrarily selected accelerometer can be adjusted to make the net effect from all accelerometers equal zero. That is $\sin \beta_a + \sin \beta_b + \sin \beta_c + \sin \beta_d = 0$, where $\sin \beta_c$ and $\sin \beta_d$ represent the acceleration terms from another pair of accelerometers that are respectively similar to the accelerometers 60a and 60b but are mounted to the disc 30 in place of the ideal accelerometers 38c and 38d (FIG. 3). For cases where the ability to calibrate this net misalignment is better than our ability to realign the accelerometers (that is, where $\sin \beta_a + \sin \beta_b + \sin \beta_c + \sin \beta_d \neq 0$), one can alter the measurement processing algorithms in processor 20 (FIG. 1) to include compensation for the net effect of Aaz, Abz, Acz and Adz (Acz and Adz being the accelerations from the other pair of accelerometers) in equation (9) and hence improve the resulting measurements. These established practices, although helpful in rejecting common axial acceleration ($Z_S$), do nothing to identify or reduce the effects of the individual axial misalignments. Therefore, as discussed below, one embodiment of the invention addresses this failure.

Referring to FIGS. 1, 4A, 4B, and 5 and again assuming that the accelerometers 60a and 60b and a corresponding pair of accelerometers are mounted to the disc 30 in place of the accelerometers 38a, 38b, 38c, and 38d, another cause of an acceleration $AZ_A$ along the $Z_A$ axis is a rotational acceleration ($\alpha$=d$\omega$/dt where $\omega$=rotational rate as discussed above) about the X or Y body axes of the gradiometer 10. Unfortunately, as discussed below, one cannot reduce or eliminate the acceleration terms introduced by these rotational accelerations by setting $\beta_b = -\beta_a$.

Figure 5:
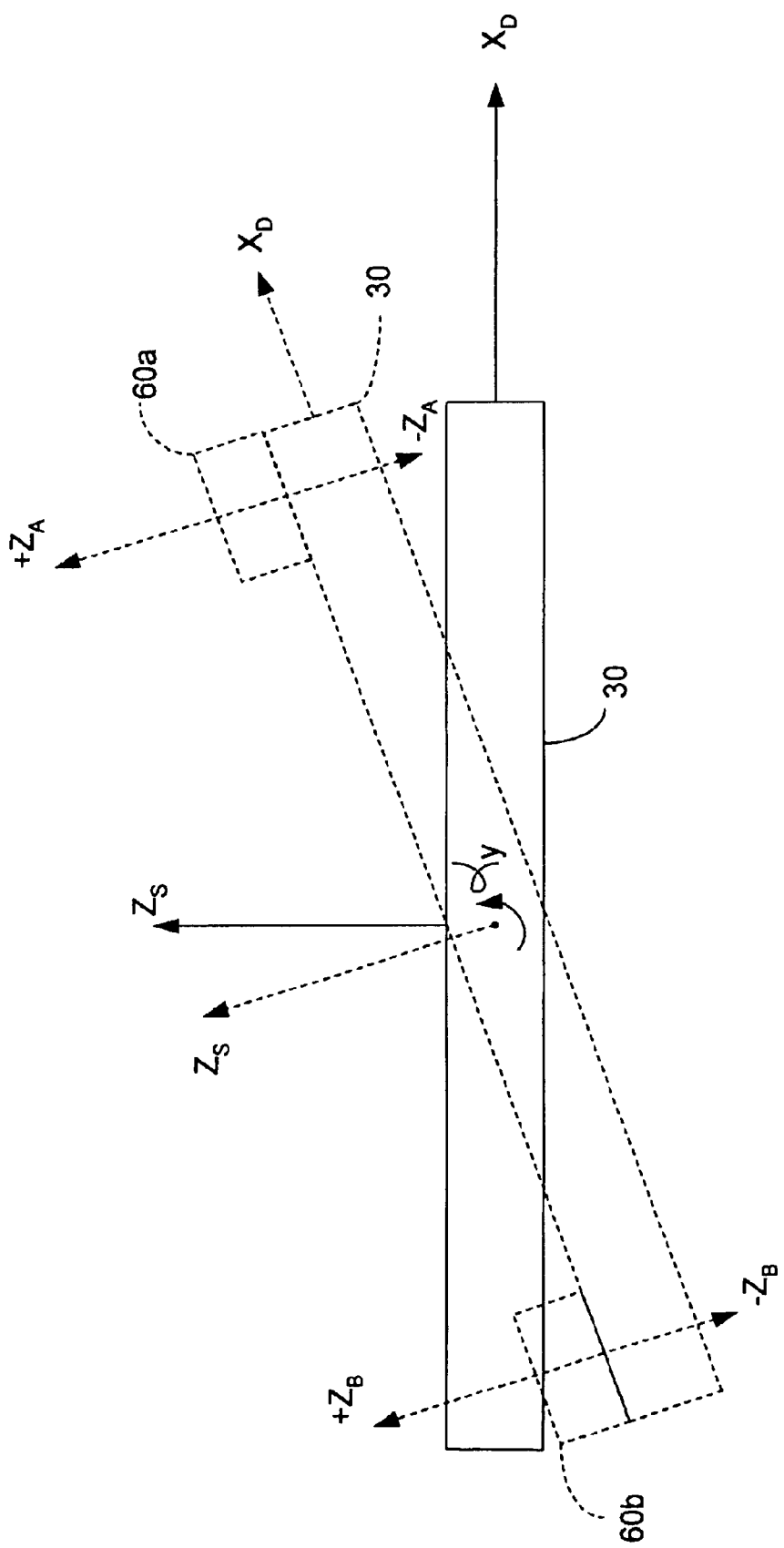
FIG. 5 is a side view of a gradiometer disc assembly that is rotating about a non-spin axis according to an embodiment of the invention.

FIG. 5 is an end view of the disc 30 taken along lines A—A of FIG. 3, where the accelerometers 38a and 38b are replaced by the accelerometers 60a and 60b of FIGS. 4A and 4B, the accelerometers 38c and 38d are replaced by accelerometers that are similar to the accelerometers 60a and 60b and whose input axes make respective angles $\beta_c$ and $\beta_d$ with the $Z_C$ and $Z_D$ axes, and the acceleration terms introduced by a rotational acceleration $\alpha$ are included in the equations (2)–(9) according to an embodiment of the invention.

The normal position of the disc 30 is drawn in solid line. In the normal position when $\Omega$t=0, the $X_D$ and $Y_D$ (normal to drawing page) disc axes are parallel and coincident with the X and Y (normal to drawing page) body axes, respectively, and the $Z_S$ spin axis is parallel to the Z body axis.

When a rotational acceleration occurs, for example a counterclockwise acceleration $\alpha_y$ about the Y body axis, then the disc 30 is accelerated toward a position that is drawn in dashed line. If $\beta_a$ and $\beta_b$ have opposite signs, then the acceleration component Aaz($\alpha_y$) measured by the accelerometer 60a is reinforced by the acceleration component Abz($\alpha_y$) measured by the accelerometer 60b. More specifically, referring to FIG. 4A, because the input axis 62a of the accelerometer 60a has a projection on the positive $Z_A$ axis, the accelerometer 60a measures a positive acceleration Aaz($\alpha_y$) in response to the rotational acceleration $\alpha_y$. Similarly, referring to FIG. 4B, because the input axis 62b of the accelerometer 60b has a projection on the negative $Z_B$ axis, the accelerometer 60b measures a positive acceleration Abz($\alpha_y$) due to the rotational acceleration $\alpha_y$. Consequently, unlike the terms Aaz and Abz (equations (11) and (12)) introduced by a nonrotational acceleration as discussed above in conjunction with FIGS. 4A and 4B, the term Aaz($\alpha_y$) introduced by the rotational acceleration $\alpha_y$ tends to be reinforced by, and not cancelled by, the term Abz($\alpha_y$) introduced by $\alpha_y$. This is true even if $\beta_b = -\beta_a$ exactly.

Referring to FIGS. 3, 4A, and 5, the acceleration term $Aaz(\alpha_y)$ introduced by $\alpha_y$ is a function of the length of the moment arm 52 and the projection of the input axis 62a on the $Z_A$ axis, and is thus given by the following equation:

$$Aaz(\alpha_y) = -\alpha_y R \cos \Omega t \sin \beta_a \quad (13)$$

And the acceleration term $Aaz(\alpha_x)$ introduced by a rotational acceleration $\alpha_x$ about the X body axis is given by the following equation:

$$Aaz(\alpha_x) = +\alpha_x R \sin \Omega t \sin \beta_a \quad (14)$$

Similarly, the error acceleration terms for the remaining accelerometer 60b and the other pair of accelerometers are given by the following equations where $\alpha_x$ (the angular acceleration about the X body axis) is appropriately scaled to account for the axis $X_D$ being parallel to, not coincident with, the body axis X:

$$Abz(\alpha_y) = +\alpha_y R \cos \Omega t \sin \beta_b \quad (15)$$

$$Abz(\alpha_x) = -\alpha_x R \sin \Omega t \sin \beta_b \quad (16)$$

$$Acz(\alpha_y) = +\alpha_y R \sin \Omega t \sin \beta_c \quad (17)$$

$$Acz(\alpha_x) = +\alpha_x R \cos \Omega t \sin \beta_c \quad (18)$$

$$Adz(\alpha_y) = -\alpha_y R \sin \Omega t \sin \beta_d \quad (19)$$

$$Adz(\alpha_x) = -\alpha_x R \cos \Omega t \sin \beta_d \quad (20)$$

A similar analysis can be made for discs lying in or parallel to the X-Z or Y-Z planes.

By including the above acceleration terms in equation (9) along with measurements from the rotational sensor assembly 18 (FIG. 1), the processor 20 can account for these measurement errors in terms of the axial misalignments of the accelerometers: $\beta_a$, $\beta_b$, $\beta_c$, and $\beta_d$. Including the terms of equations (14)–(20) in equation (9) and subtracting the ideal result (the right-hand side of equation (9)) leaves the following formulation of errors induced by rotational accelerations:

signal errors induced by rotational accelerations = $((\alpha_x \sin \Omega t - \alpha_y \cos \Omega t)(\sin \beta_a - \sin \beta_b) - (\alpha_x \cos \Omega t + \alpha_y \sin \Omega t)(\sin \beta_c - \sin \beta_d))R/2$ (21)

In a manner analogous to the error correction for non-rotational accelerations described above, this information can be used in several ways to improve the gradient measurement. If the misalignments $\beta_a$, $\beta_b$, $\beta_c$, and $\beta_d$ have been calibrated, then the resulting errors can be simply calculated and removed by the processor 20. Conversely, a calibration of these misalignments can be implemented by obtaining an optimal fit between the error gradients obtained during a calibration procedure and the measurements obtained by the rotational sensor assembly 18 (FIG. 1). As discussed above, a rotational calibration acceleration can be injected by a calibration/test machine during pre-shipment calibration of the gradiometer. Alternatively, the gradiometer can self calibrate by using rotational accelerations provided by the vehicle in which it is mounted.

Furthermore, the technique is similar for discs that lie in the X-Z or Y-Z planes. Other embodiments of the invention are contemplated. For example, the rotational sensor assembly 18 (FIG. 1) may be partially or wholly located on the rotating disc 30. In this case the resolution of the sensed rotations into the frame of the accelerometers, implied by the $\sin(\Omega t)$ and $\cos(\Omega t)$ terms in equation (21), is unnecessary. Furthermore, equations (11)–(21) can be modified according to known mathematical principles where a disc lies in a plane that is not coincident with or parallel to one of the X-Y, X-Z, or Y-Z body-axis planes. Moreover, one can determine the angles $\beta_a$ and $\beta_b$ by conventional techniques such as spinning the disc 30 about the $Y_D$ axis at a known rotational acceleration when the disc is in the $\Omega t = 0$ position.

What is claimed is:

1. A gravity gradiometer, comprising:
   a disc having a spin axis and a radial disc axis that is orthogonal to the center axis;
   an accelerometer mounted to the disc along the disc axis, having a coordinate axis parallel to the spin axis of the disc, having an input axis, and operable to measure an input acceleration along the input axis; and
   a processor coupled to the disc and operable to calculate a gravity tensor element as a function of an acceleration term due to an acceleration along the coordinate axis of the accelerometer.

2. The gravity gradiometer of claim 1, further comprising:
   a rotational sensor assembly coupled to the processor and operable to measure angular acceleration of the disc about an axis that is parallel to the disc; and
   wherein the acceleration term is a function of the measured angular acceleration.

3. The gravity gradiometer of claim 1 wherein:
   the input axis of the accelerometer is separated from the coordinate axis of the accelerometer by an angle; and
   wherein the acceleration term is a function of the angle.

4. The gravity gradiometer of claim 1 wherein the processor is operable to account for the acceleration term by assuming that the disc is rigid.

5. A gravity gradiometer, comprising:
   a housing having first, second, and third orthogonal body axes;
   a disc mounted within the housing and having a spin axis and having first and second radial disc axes that are orthogonal to the spin axis and to each other;
   an accelerometer mounted to the disc and having a coordinate axis that is parallel to the spin axis of the disc and having an input axis, the accelerometer operable to measure an input acceleration along the input axis;
   a rotational sensor assembly mounted within the housing and operable to measure rotation of the housing about the first, second, and third body axes; and
   a processor coupled to the sensor assembly and operable to calculate a gravity tensor element by solving an equation that includes the measured input acceleration and an acceleration term that represents a component of the measured input acceleration caused by a rotation of the housing about one of the first, second, and third body axes.

6. A gravity gradiometer, comprising:
   a housing having first, second, and third orthogonal body axes;
   a disc mounted within the housing and having a spin axis and having first and second radial disc axes that are orthogonal to the spin axis and to each other;
   an accelerometer mounted to the disc and having a coordinate axis that is parallel to the spin axis of the disc and having an input axis, the accelerometer operable to measure an input acceleration along the input axis;
   a rotational sensor assembly mounted within the housing and operable to measure rotation of the housing about the first, second, and third body axes;

a processor coupled to the sensor assembly and operable to calculate a gravity tensor element by solving an equation that includes the measured input acceleration and an acceleration term that represents a component of the measured input acceleration caused by a rotation of the housing about one of the first, second, and third body axes;

wherein:

the input axis of the accelerometer is separated from the disc by an angle; and wherein the acceleration term is a function of the angle.

7. The gravity gradiometer of claim 6 wherein:

the second and third body axes lie in a first plane;

the disc lies in a second plane that is substantially parallel to the first plane; and the acceleration term is a function of an angle between one of the first and second disc axes and one of the second and third body axes.

8. A method, comprising:

measuring an acceleration along an input axis of an accelerometer mounted to a gradiometer disc, the accelerometer having a coordinate axis that is parallel to a spin axis of the disc; and calculating a gravity tensor element as a function of the measured input acceleration and a first component of the measured acceleration caused by an acceleration along the coordinate axis of the accelerometer.

9. The method of claim 8 wherein the first component of the measured input acceleration is a function of a rotational acceleration of the disc about an axis that is not parallel to the spin axis of the disc.

10. The method of claim 8, further comprising:

measuring a rotational acceleration of the disc about an axis that is parallel to the disk; and wherein the first component of the measured input acceleration is a function of the measured rotational acceleration.

11. The method of claim 8 wherein calculating the gravity tensor element comprises solving an equation that includes the measured input acceleration and a known value of the component of the measured input acceleration.

12. The method of claim 8 wherein the component of measured input acceleration is a function of an angle between the coordinate axis and the input axis of the accelerometer.

13. The method of claim 8 wherein:

calculating the gravity tensor element comprises calculating the gravity tensor element as a function of a second component of the measured acceleration caused by an acceleration along the coordinate axis of the accelerometer;

the first component of the measured input acceleration is a function of a rotational acceleration of the disc about a first axis that is not parallel to the spin axis of the disc; and the second component of the measured input acceleration is a function of a rotational acceleration of the disc about a second axis that is not parallel to the spin axis of the disc and that is orthogonal to the first axis.

14. The method of claim 8 wherein:

calculating the gravity tensor element comprises calculating the gravity tensor element as a function of a second component of the measured acceleration caused by an acceleration along the coordinate axis of the accelerometer;

the first component of the measured input acceleration is a function of a rotational acceleration of the disc about a first axis that is orthogonal to the spin axis of the disc; and the second component of the measured input acceleration is a function of a rotational acceleration of the disc about a second axis that is orthogonal to the spin axis and to the first axis.

15. A method, comprising:

receiving an input acceleration measured along an input axis of an accelerometer that is mounted along a radial disc axis of a rotating gradiometer disc;

receiving a rotational acceleration about a first body axis of a housing within which the disc is mounted; and calculating a gravity tensor element as a function of the input acceleration and a first component of the input acceleration, the first component being a function of the rotational acceleration and an angle between the input axis and a surface of the disc.

16. The method of claim 15, further comprising:

downloading the received input acceleration and rotational acceleration to a processor disposed outside of the housing; and wherein the processor calculates the gravity tensor element.

17. The method of claim 15 wherein the first component of the input acceleration is also a function of an angle between the disc axis and the first body axis.

18. The method of claim 15, further comprising:

receiving a rotational acceleration about a second body axis of the housing, the second body axis being orthogonal to the first body axis; and wherein calculating the gravity tensor element comprises calculating the gravity tensor element as a function of the a second component of the input acceleration, the second component being a function of the rotational acceleration about the second body axis and the angle between the input axis and the surface of the disc.

19. A method, comprising:

receiving input accelerations measured along input axes of accelerometers that are mounted along orthogonal disc axes of a rotating gradiometer disc;

receiving first and second rotational accelerations about orthogonal first and second body axes of a housing within which the disc is mounted; and calculating a gravity tensor element as a function of the input accelerations and first ands second components of the input accelerations, the first component being a function of the first rotational acceleration and angles between the input axes and a surface of the disc, the second component being a function of the second rotational acceleration and the angles between the input axes and the surface of the disc.

20. The method of claim 19 wherein:

the disc is parallel to a plane that includes the first and second body axes; and calculating the gravity tensor element comprises calculating the gravity tensor element as a function of an angle between one of the disc axes and one of the body axes.

* * * * *

UNITED STATES PATENT AND TRADEMARK OFFICE
CERTIFICATE OF CORRECTION

PATENT NO. : 6,799,459 B2
DATED : October 5, 2004
INVENTOR(S) : Daniel E. Dosch and David L. Sieracki It is certified that error appears in the above-identified patent and that said Letters Patent is hereby corrected as shown below:

Column 12,
Line 38, should read -- a second component of the input acceleration, the --
Line 52, should read -- input accelerations and first and second components of --

Signed and Sealed this

First Day of February, 2005

JON W. DUDAS
*Director of the United States Patent and Trademark Office*